United States Patent [19]

Umeda et al.

[11] Patent Number: 4,724,464

[45] Date of Patent: Feb. 9, 1988

[54] AREA SETTING DEVICE

[75] Inventors: Tadashi Umeda, Yamatotakada; Hiromi Okada; Naoki Nakashima, both of Sakai; Tetsuya Kagawa, Komae; Masanobu Maeshima; Tadashi Kobata, both of Sakai; Shinobu Satonaka, Toyonaka; Jun Miyoshi, Higashiosaka; Yusuke Morikawa, Neyagawa, all of Japan

[73] Assignee: Mita Industrial Co., Ltd., Japan

[21] Appl. No.: 940,146

[22] Filed: Dec. 10, 1986

Related U.S. Application Data

[63] Continuation of Ser. No. 880,862, Jul. 1, 1986, abandoned.

[30] Foreign Application Priority Data

Jul. 5, 1985 [JP] Japan ............................... 60-148779
Jul. 5, 1985 [JP] Japan ............................... 60-103242[U]

[51] Int. Cl.⁴ ............................................ G03B 27/53

[52] U.S. Cl. ........................................ 355/40; 355/7; 355/74

[58] Field of Search ............................... 355/40, 74, 7

[56] References Cited

U.S. PATENT DOCUMENTS

| | | | |
|---|---|---|---|
| 4,012,122 | 3/1977 | McVeigh | 355/40 |
| 4,078,862 | 3/1978 | Kuwana | 355/40 |
| 4,256,400 | 3/1981 | Komori et al. | 355/7 XR |
| 4,474,453 | 10/1984 | Yanagawa et al. | 335/14 C |
| 4,563,084 | 1/1986 | Hayat et al. | 355/40 |
| 4,582,417 | 4/1986 | Yagasaki et al. | 355/7 |
| 4,607,949 | 8/1986 | Hakamada et al. | 355/40 |
| 4,627,707 | 12/1986 | Tani et al. | 355/7 XR |
| 4,634,260 | 1/1987 | Watanabe | 355/7 |
| 4,653,899 | 3/1987 | Watanabe | 355/7 XR |

FOREIGN PATENT DOCUMENTS

| | | |
|---|---|---|
| 0175962 | 4/1986 | European Pat. Off. . |
| 58-10771 | 1/1983 | Japan . |
| 58-43480 | 3/1983 | Japan . |
| 59-15948 | 1/1984 | Japan . |
| 60-4962 | 1/1985 | Japan . |

*Primary Examiner*—L. T. Hix
*Assistant Examiner*—D. Rutledge
*Attorney, Agent, or Firm*—Beveridge, DeGrandi & Weilacher

[57] ABSTRACT

An area setting device for setting coordinates of two points in a diagonal direction in one or more areas to be copied by a photocopier utilizing key operation in sequence, in which different colors are used for coordinate display in each direction. The same colors as the coordinate displays are used for coordinate input indicators. All the points are memorized as to whether coordinates have been applied. A key input is accepted for the first point not having coordinates applied, and this converts the memorized condition. Key input acceptance and memory state conversion are repeated for all the points required.

5 Claims, 15 Drawing Figures

| | 7 | 6 | 5 | 4 | 3 | 2 | 1 | 0 |
|---|---|---|---|---|---|---|---|---|
| (A) | 0 | 0 | 0 | 0 | 0 | 0 | 0 | 0 |
| (B) | 0 | 0 | 0 | 0 | 0 | 0 | 0 | 1 |
| (C) | 0 | 0 | 0 | 0 | 0 | 0 | 1 | 1 |
| (D) | 0 | 0 | 0 | 0 | 0 | 1 | 1 | 1 |
| (E) | 0 | 1 | 1 | 1 | 1 | 1 | 1 | 1 |
| (F) | 1 | 1 | 1 | 1 | 1 | 1 | 1 | 0 |
| (G) | 1 | 1 | 1 | 1 | 1 | 1 | 0 | 1 |

63

AREA SETTING DEVICE

This is a continuation, of application Ser. No. 880,862 filed July 1, 1986 (now abandoned).

BACKGROUND OF THE INVENTION

The present invention relates to an area setting device. More particularly, the present invention relates to an area setting device for a photocopier which can set the areas required for special processing such as the forming of images only within a preset area, i.e., trimming, or the blocking of images within a preset area, i.e., masking, the area being set by the coordinates of two points in a diagonal direction.

An increasing number of functions have been required in the image forming apparatus of copying machines, and image forming apparatus permitting editing functions, such as trimming and masking, as a part of multifunction arrangement are known. Such image forming apparatus having an editing function are provided with an area setting device because area setting is essential for this editing processing. To be more specific, one known device is of the type that permits setting of the desired area by placing documents under a cover having a grid pattern with an indicator to show values of coordinates perpendicular to each other, selecting the mode such as trimming or masking, actuating an X-key and numeric keys to indicate the numeric value of the setting range along an X-axis, and actuating a Y-key and numeric keys to indicate the numeric value of the setting range along the Y-axis. (Refer to the Official Gazzette of Japanese Patent Publication (unexamined) No. 43480/1983.)

With the area setting device as described above, desired areas can be set or the area once set can be changed by sequential operation of the required keys. However, the key operation is intricate and very difficult for inexperienced operators, and erroneous setting or alteration of coordinates is likely.

To change the coordinates of a point for which input has already been completed, first the coordinate change key is operated, then new coordinates are set by operating the X-key, Y-key, and numeric keys. If the operator is inexperienced, however, coordinates which need no alteration might be changed, with the result that undesired images are formed.

As is evident from the above description, setting of any desired area can be achieved by operating the necessary keys in sequence. The trouble is that operation is very difficult for inexperienced operators, and inadvertent setting of coordinates for a wrong axis setting is likely, as the key operation is complicated and the directions of the X-axis and the Y-axis are not obvious.

SUMMARY OF THE INVENTION

An object of the present invention is to provide an area setting device that is easier to use due to a simplified arrangement.

Another object of the invention is to provide an area setting device for setting and changing coordinates easily by the same key operation.

A further object of the invention is to provide an area setting device which enables accurate area setting, even by inexperienced operators.

A still further object of the invention is to provide an area setting device which enables easy and exact recognition of the direction of the coordinates to be set.

To accomplish the above mentioned objects, the area setting device according to the present invention comprises memorizing means, first memory control means, coordinate input control means, judging means, and second memory control means.

The memorizing means memorizes whether coordinate inputs have been applied selectively corresponding to each point which can be set. The first memory control means memorizes the coordinates of the first point of all areas for which coordinate input conditions have already been memorized, the coordinate input control means is to accept only the key input indicative of the point of the highest order among the points memorized as coordinate non-input condition, the judging means is to determine whether the point of the next order to the point memorized is in a coordinate non-input condition, and the second memory control means is to memorize the point memorized as coordinate non-input condition as the point of coordinate input condition by judging signal from the judging means when coordinates input of the point is made or when it is fixed that new coordinates input of the specific point is not made and also to memorize the point of the next order as coordinate non-input condition.

With the area setting device as described above, when coordinates of the point are set by operation of the keys, the coordinates are accepted as the coordinates of the point of the highest order among the points memorized in the memorizing means as coordinates non-input condition by the coordinates input control means, and memorize the point as coordinates input condition into the memorizing means. Coordinates of all the points necessary can also be set by memorizing each point as coordinates input condition into the memorizing means by repeating the same operation one after another.

When input of the coordinates of required number completes, set the point of the highest order memorized in the memorizing means as coordinates input condition by the first memory control means at coordinate non-input condition, then coordinates input of the specific point becomes possible.

New coordinates input thereafter is accepted as the coordinates of the highest order among the points set as coordinate non-input condition, the point of the next order is judged to be in coordinate input condition by the judging means, then the accepted point is turned to coordinate input condition and the point of the next order is turned to coordinate non-input condition so that the point of the next order can accept new coordinates.

As a preferred embodiment of the area setting device according to the present invention, with a transparent member to be set on the document of which area is to be set, and with coordinate displays crossing each other at right angles at the specific position on the transparent member are colored in different colors respectively, a coordinate input position display and coordinate value displays to each direction are attached to the operation panel of the image forming apparatus, and each coordinate input position displays are colored equally to the corresponding coordinate displays.

By the preferred embodiment as described above, it is possible to visually know the area to be set by the coordinate displays under the condition of setting a transparent member on the document, and to carry out input of the coordinate values to be set by the operation means while visually recognizing the direction into which coordinate input is possible by the coordinate input position display color corresponding to the color of coordinate display in each direction.

It is more preferable that the coordinate value displays show coordinate values in the same color as the corresponding coordinate displays.

By the above more preferable embodiment, it can be judged visually whether or not the displayed coordinate values are set exactly.

DESCRIPTION OF THE PREFERRED EMBODIMENT

The present invention is further described while referring now to the attached drawings showing a preferred embodiment.

Figure 5:
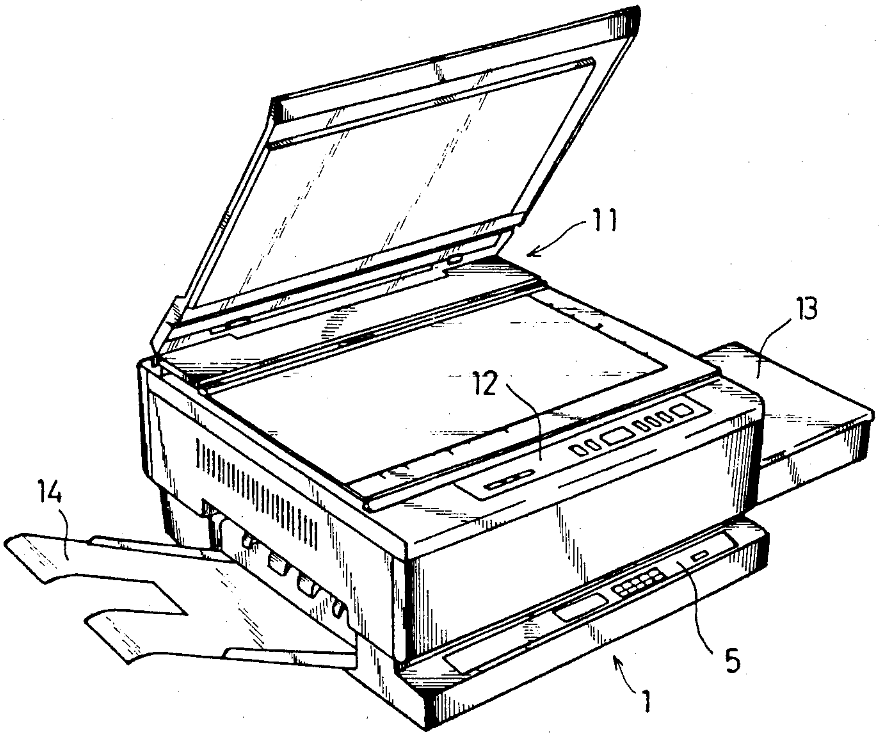
FIG. 5 is a perspective view of a copying machine.

FIG. 5 is a perspective view of a copying machine which comprises an image forming apparatus. A document tray (11) is attached to the upper face of the copying machine (1) and can move back and forth thereon freely. An operation panel (12) for setting ordinary copying data is also attached. Another operation panel (5) for setting editing data is attached to the front bottom, and a paper feeding cassette (13) is attached to the bottom of a side so that it can be pulled out. A receiving plate (14), for receiving copying paper with images formed thereon, is attached to the bottom of the other side.

Figure 6:
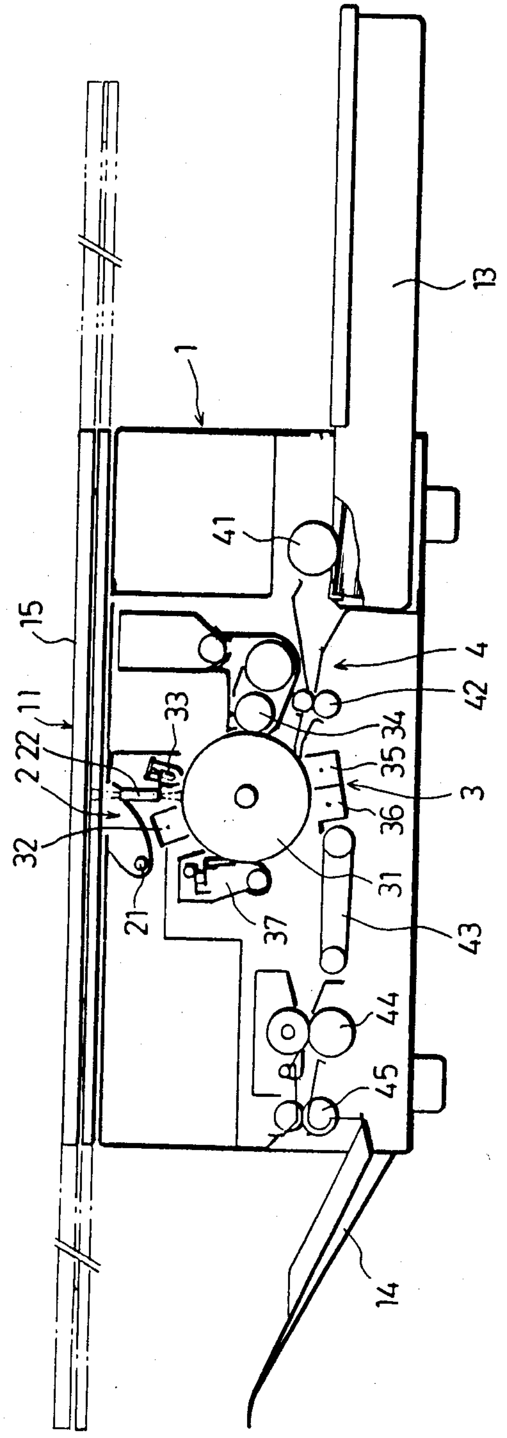
FIG. 6 is a diagrammatic view showing the internal mechanism of a copying machine.

FIG. 6 is a diagrammatic view showing the internal mechanism of the copying machine, including an optical system (2), a copying section (3) and a paper conveying section (4) within the copying machine proper (1).

The optical system (2) is composed of a lamp (21) to expose a document, held on the document tray (11) by a document holder (15), and of a lens (22) to direct the reflected light from the document to the copying section (3).

The copying section (3) comprises a corona discharger (32), a blank lamp (33), a developing device (34), a transfer charger (35), a separating charger (36), and a cleaner (37) arranged in the order mentioned around a photoreceptor drum (31) which rotates in one direction. The surface of the photoreceptor drum (31) is uniformly charged by the corona discharger (32), and the image of the document is directed to the surface of the photoreceptor drum (31) so as to form thereon an electrostatic latent image, which is turned into an apparent toner image by the developing device (34). The toner image is transferred by the transfer charger (35) onto copying paper carried by the paper conveying section (4), and the copying paper is peeled off the photoreceptor drum (31) by the separating charger (36). The paper conveying section (4) is composed of a feed roller (41), a resist roller (42), a conveying belt (43), a fixing apparatus (44), and a discharge roller (45). Copying paper is delivered sheet by sheet from the paper feeding cassette (13) by the feed roller (41), then is conveyed to the copying section (3) synchronized with the top end of the electrostatic latent image by means of the resist roller (42). The copying paper peeled from the photoreceptor drum (31) by the separating charger (36) is carried to the fixing apparatus (44) by the conveying belt (43), and the copying paper onto which the toner image is fixed in the fixing apparatus (44) is discharged onto the receiving plate (14) by the discharge roller (45).

Figures 2, 3:
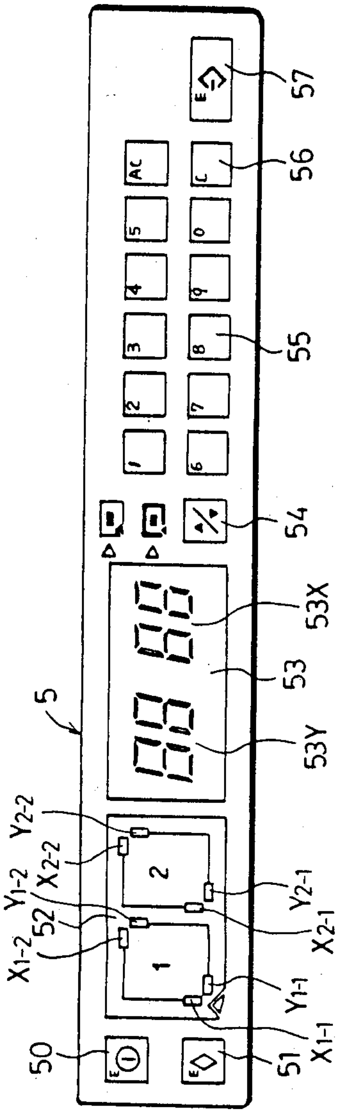
FIG. 2 shows the operation panel for area setting.
FIG. 3 shows an embodiment of the memorizing section to memorize the condition of each point.

FIG. 2 shows the editing operation panel (5) including an editing operating condition select key (50), a coordinate data call key (51), a coordinate input condition display (52), a coordinate value display (53), an editing mode (trimming, masking etc.) select key (54), ten numeric keys (55), a clear key (56), and a coordinate value input key (57). To be more specific, the coordinate input condition display (52) selectively indicates values X1-1 and Y1-1, X1-2 and Y1-2, X2-1 and Y2-1, and X2-2 and Y2-2 corresponding to two points in a diagonal direction for each of two areas. The coordinate value display (53) has an X-direction coordinate value indicator (53X) and a Y-direction coordinate value indicator (53Y).

Figure 4:
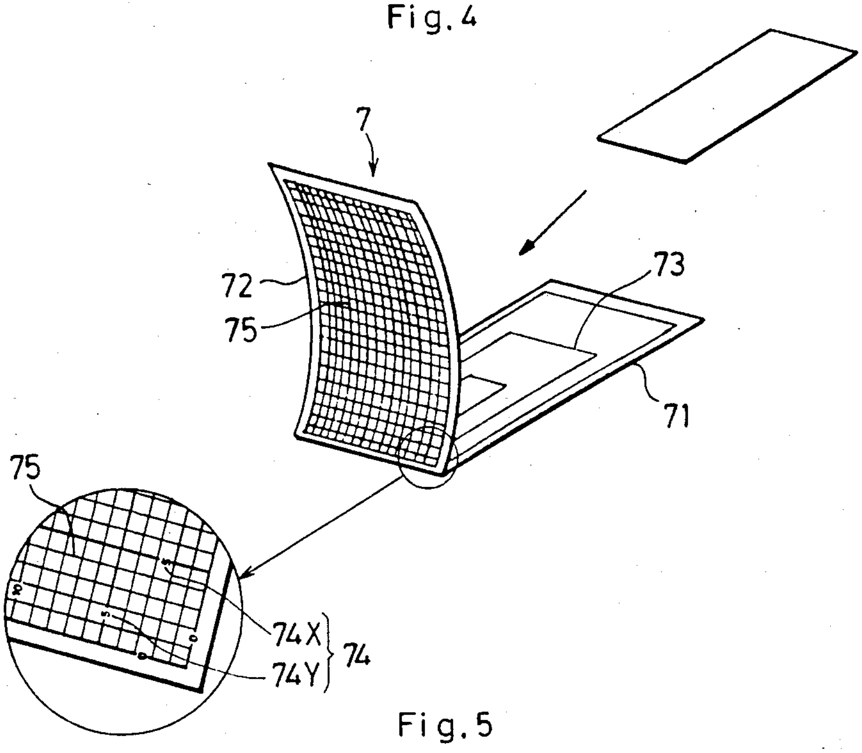
FIG. 4 is a perspective view of the document holding section.

FIG. 4 is a perspective view of the document holder (7) which is composed of a holding member (71) to hold a document and a transparent member (72) to cover the document. Holding member (71) and transparent member (72) are connected together at one side permitting transparent member (72) to be opened and closed. To be more specific, the holding member (71) is made of a synthetic resin sheet, and a set of position marks (73), corresponding to each document size, is marked at the specific position for placement of a document on the sheet. The transparent member (72) is made of a transparent synthetic resin and has marked thereon coordinate value indicators (74) in the directions crossing at right angles to each other and a lattice (75) for easier reading of coordinates values.

Figure 1:
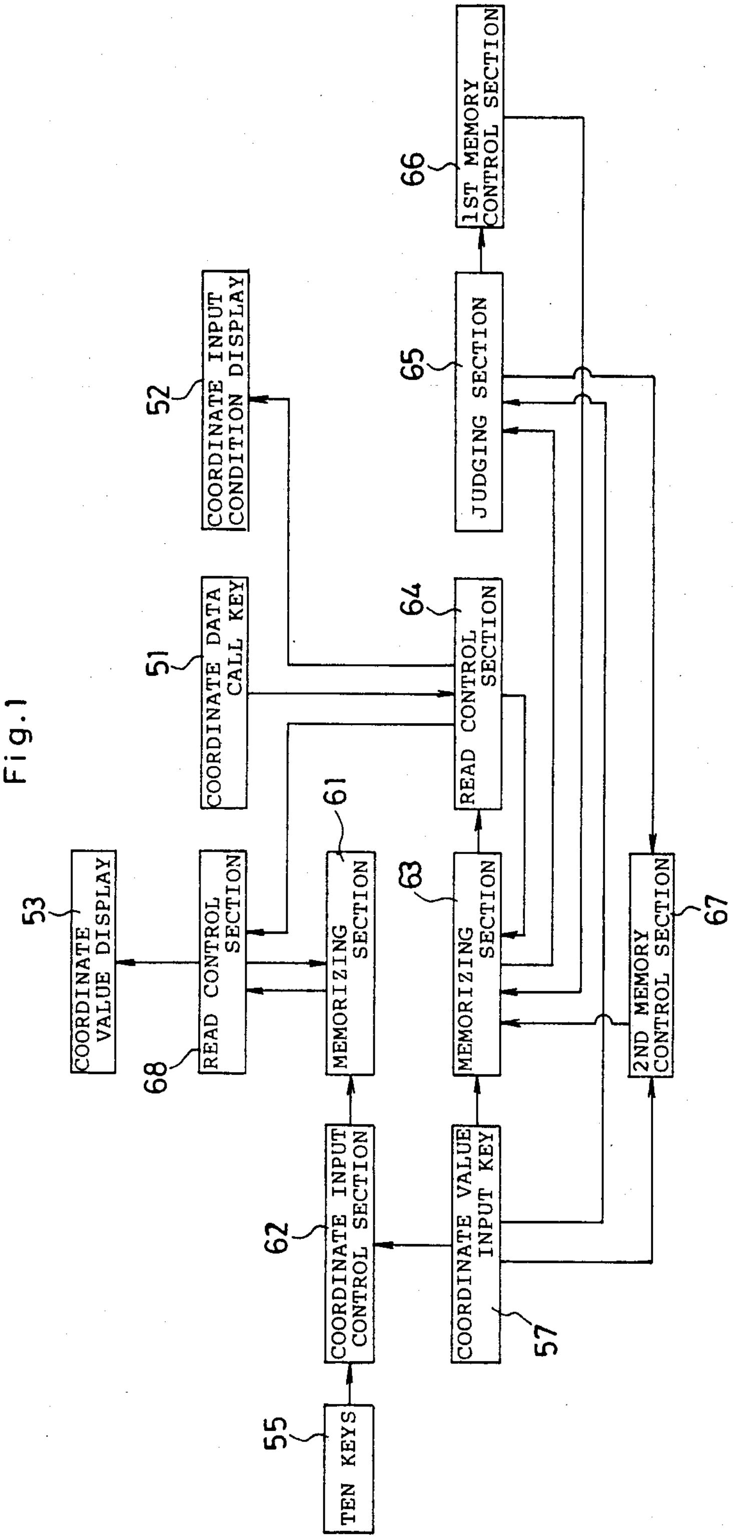
FIG. 1 is a block diagram showing an embodiment of the area setting device.

FIG. 1 is a block diagram showing the key sections of an embodiment of the area setting device. The signals from the above mentioned ten numeric keys (55) and the signals from the coordinate value input key (57) are applied through a coordinate input controller (62) to a memory (61) which stores the coordinates of each point, and the signals from the coordinate value input key (57) are applied to the memorizing section (63) which stores the condition of each point, separating points for which input coordinates have been applied from points for which no input coordinates have been applied.

Information from the memorizing section (63) showing the condition of each point is applied to a judging section (65) under the control of a read control section (64) to which the signal from the coordinate data call key (51) is applied. The signals from the coordinate value input key (57) are also applied to the judging section (65).

The signals from the judging section (65) are applied to the first memory control section (66). The judged signals from the judging section (65) and also the signals from the coordinate value input key (57) are applied to the second memory control section (67), and the control signals from the first memory control section (66) and from the second memory control section (67) are applied to the memorizing section (63).

The read signals from the read control section (68) to read the coordinate values stored in the memorizing section (61) are applied to the coordinate value display (53) in response to the signals from the read control section (64) corresponding to the signals from the coordinate data call key (51). The read signals from the read control section (64) corresponding to the signals from the coordinate data call key (51) are also applied to the coordinate input condition display (52).

The area setting device of the above configuration permits selection of modes such as trimming and masking in the initial stage of an area setting operation by operating the editing operating condition select key (50) first taken by operating the editing mode select key (54).

A document is set between the holding member (71) and the transparent member (72), fitting the set position mark (73). Then the coordinate values of the area to be set are read from the coordinate value indicators (74) and the lattice (75). After operating the ten numeric keys (55) so that the coordinate value indicator (53) shows the desired value under the above condition, one coordinate value of the first point to be defined is set by operating the coordinate value input key (57). In this case, input in the X direction, X1-1 for example, is displayed. Then another coordinate value of the above mentioned point can be set by operating the ten numeric keys (55) and the coordinate value input key (57). In this case, input in the Y direction, Y1-1 for example, is displayed.

At this time, the memory location within memorizing section (63) which corresponds with the specific point is changed to indicate that a point coordinate has been applied by the signals from the coordinate value input key (57).

By repeating the above operations, it is possible now to set the coordinates of the points in the diagonal direction of all the areas to be set. When coordinate setting of all the points is completed, the memory location of memorizing section (63) corresponding to the first point is changed to indicate that no input coordinate has been applied.

Even after coordinate setting has been completed for all the required points, the set value can be changed. First the coordinate data call key (51) is operated, then the coordinate values of the first point for which values have not yet been stored in memorizing section (63) are read out from the memorizing section (61) and are displayed on the coordinate value display (53), and the coordinate input condition display (52) corresponding to one coordinate of the specific point is turned on. Under this condition, it is possible to store new coordinate values in memorizing section (61) in place of the original coordinate values by operating the ten numeric keys (55) and the coordinate value input key (57).

For the points that require no alteration of the coordinate values, operation of the coordinate value input key (57) is done again, then the coordinates of the next point of the display can be changed.

FIG. 3 shows an embodiment of the memorizing section (63) composed of memories of 8-bits in which the bits for which values are stored are shown by "1" and the bits for which values are not stored are indicated by "0". From lower order to higher, each bit corresponds to X-coordinate, Y-coordinate of the first point in the first area, . . . , X-coordinate, Y-coordinate of the second point in the second area, in due order, and only the point corresponding to the bit showing "0" status of the lowest order is in coordinate input condition.

To indicate the point ready for coordinate input, therefore, the coordinate input condition display (52), showing the points corresponding to the bit of the lowest order among the bits in the "0" state in the above memorizing section (63), is flashed, the coordinate input condition display (52), showing the points corresponding to the bit in the "1" state is kept ON continuously, and the coordinate values of the point flashing are displayed on the coordinate value display (53).

For coordinate input, it is judged whether or not the bit next in higher order to the bit of "0" state of the lowest order is in "0" state. If the bit is in "0" state, the condition is kept even after completing the coordinate input operation. If the bit is in "1" state, it is changed to "0" state after completing the coordinate input operation. In this case, the input coordinate values are written into the memorizing section (61) with no regard to the state, "0" or "1".

In FIG. 3, A–E show the bit condition of the memorizing section (63) for sequential input of coordinate values and the bits are changed to "1" state from the lowest order one after another at every input of setting.

To change the coordinate values of the necessary point after input of the values, the bit of the lowest order is changed from "1" to "0" state, as shown by F in the drawing, by operating the coordinate data call key (51). Thus, the setting of new coordinate value is possible by operating the required keys. When setting of a new coordinate value is made, the bit of the lowest order is changed to "1" state, as shown by G in the drawing, and the next bit is turned to "0" state to be ready for input of the coordinate value corresponding to this bit.

By the above embodiment, therefore, it is possible to perform input of the present coordinates in sequence without any special operation of the preset coordinate values, by memorizing each point selectively in coordinate input condition or coordinate non-input condition. Moreover, the coordinate value can be changed easily merely by input of a new value when the present coordinate value is called. Accordingly, operation of area setting can be easily done. Another advantage is that the inconvenience of again setting the document on the document tray (11) can be omitted by setting a copy obtained in one copying operation on the document holder, and by setting the coordinates, and that coordinate setting can be exact.

As a more preferred embodiment, the coordinate input condition display (52) is so made to indicate X-direction inputs X1-1, X1-2, X2-1, X2-2 and Y-direction inputs Y1-1, Y1-2, Y2-1, Y2-2 corresponding to two points in a diagonal direction selectively for each of two areas, and these are displayed in the same color as each one of the X-direction coordinate value indications and the Y-direction coordinate value indications on the document holder (7) which holds the document for area setting.

The coordinate value display (53) has an X-direction coordinate value indicator (53X) and a Y-direction coordinate value indicator (53Y), and each coordinate value is shown in the same color as the above mentioned X-direction coordinate value indication and Y-direction coordinate value indication respectively.

The lattice (75) is in the same color as each one of the corresponding coordinate value indications (74). To be more specific, the coordinate value indications (74) and the lines of lattice (75) that extend parallel to the connected side (called Y-direction parts in the following text) (74Y) are colored in red and the parts perpendicular to that side (called X-direction parts) (74X) are colored in green.

Corresponding to the above coordinate indications (74) and the lattice (75), the coordinate input position display (52), therefore, is colored in red and green, and the coordinate value display (53) also displays coordinate values in red and green corresponding to the coordinate indication (74) and the lattice (75). In other words, the Y-coordinate value display (53Y) is in green and the X-coordinate value display (53X) is in red.

By the above preferred embodiment, there is displayed the coordinate value of the point which should be set by selectively driving the displays for X-direction input position X1-1 and for Y-direction input position Y1-1, and the value is displayed in the same color (red or green) as the corresponding coordinate value indication (74) and lattice (75). The problem of setting the coordinate value for the wrong direction by mistake can therefore be prevented effectively.

It is also possible to easily and exactly make sure that the displayed data are those of the desired direction, and this can be done at coordinate setting, at the end of coordinate setting, or at checking of already set coordinates, by operating the coordinate data call key (51) because the displayed data on the coordinate value display (53) are in the same color as the corresponding coordinate value display (74) and the lattice (75) (red or green).

By the above embodiment, each direction of each point to be set is displayed corresponding to the color of the coordinate indication in each direction of the transparent member set on the document. Accordingly, coordinates are set in the correct setting direction by visually reading the coordinate in the direction to be set and of the point to be set on the same colored part of the coordinate indication of the transparent member, which serves for exact setting of area.

Figure 7:
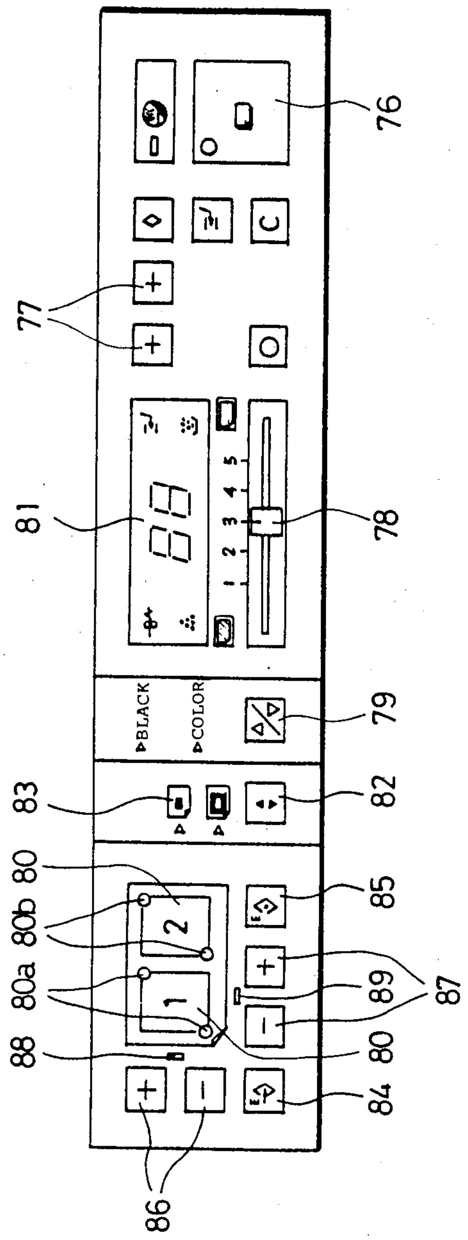
FIG. 7 shows another embodiment of the operation panel.

FIG. 7 shows another embodiment of the operation panel, which comprises a print key (76), two incrementing keys (77), a darkness setting scale (78), a color designating key (79), a coordinate value display (81), a mode select key (82) for selecting modes such as trimming and masking, a mode indicator (83) to indicate the selected mode, a coordinate input key (84), an input end key (85), a coordinate value adjust key in width direction (86) as a coordinate designation key in the transversal direction, a coordinate value adjust key in the length direction (87) as a coordinate designation key in longitudinal direction, an input condition indicator in the width direction (88), an input condition indicator in the length direction (89), a square area indicator (80), and coordinate input position indicators (80*a*) (80*b*) corresponding to two points in a diagonal direction of the area indicator (80). By operating the mode select key (82), therefore, it is possible to show the selected mode on the mode indicator (83).

To set coordinate values in the transversal direction, the coordinate input key (84) is operated, then the transversal coordinate value adjust key (86) is operated, and the desired coordinate value in the transversal direction is selected.

Moreover, it is possible to judge easily which key should be operated to increase or decrease coordinate values because each coordinate adjust key (86) is composed of a key for increasing the value and a key for decreasing the value, and the coordinate value decreasing key is provided at the side of the origin. Execution of setting operation of the coordinate values in the transversal direction can be indicated in this case by turning the transversal direction input condition indicator (88) ON. When a desired coordinate value in transversal direction is selected, input of the coordinate value can be made by operating the coordinate input key (84).

To set coordinate values in the longitudinal direction, on the other hand, the coordinate input key (84) is operated; however, there is no need to operate the key again if it was just operated for the preceding coordinate value setting. Next, the longitudinal coordinate value adjust key (87) is operated, and the desired coordinate value in the longitudinal direction is selected. In this case, it can be indicated that the setting operation of coordinate values in the longitudinal direction is currently being done by turning on the longitudinal input condition indicator (89).

When a desired coordinate value in the longitudinal direction is selected, input of the coordinate value can be made by operating the coordinate input key (84). The point which should be set is indicated by turning on the coordinate input position indicators (80*a*) (80*b*) one after another at every setting of the coordinate value by operating the coordinate input key (84).

Figure 8:
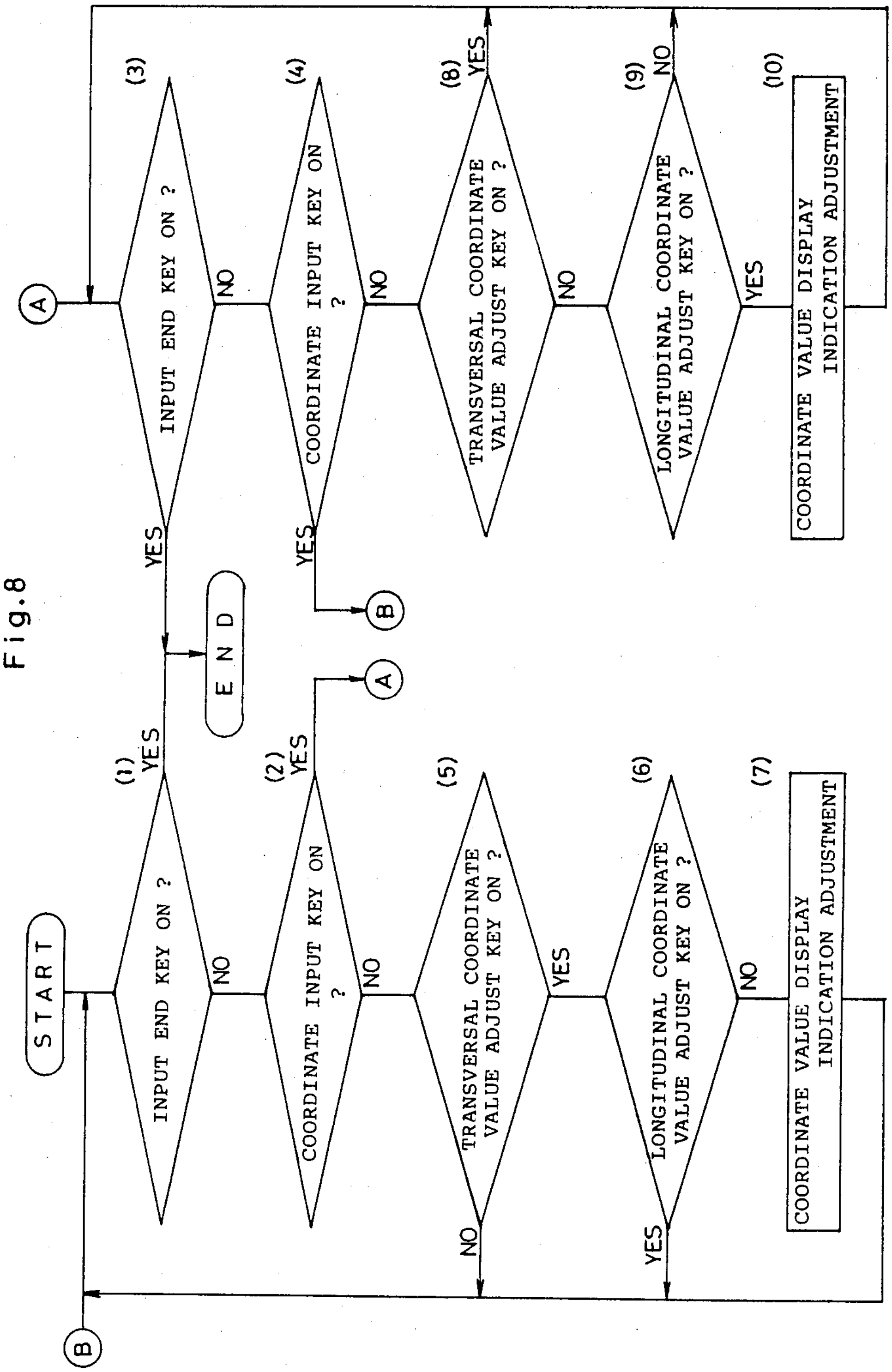
FIG. 8 is a flow chart to explain the area setting operation of the operation panel of FIG. 7.

FIG. 8 is a flow chart for the detailed description of the area setting operation. At step (1), it is determined whether or not the input end key (85) is operated. If it is operated, the area setting operation is completed. If that key is not operated, it is determined at step (2) whether or not the coordinate input key (84) is operated. If the judgment at step (2) is that the coordinate input key (84) is not operated, it is determined at step (5) and step (6) whether or not the transversal direction coordinate value adjust key (86) and the longitudinal direction coordinate value adjust key (87) are operated.

If only the transversal coordinate value adjust key (86) is operated, indication of the coordinate value display (81) corresponding to the transversal coordinate value adjust key (86) being operated is adjusted at step (7), then the sequence returns to step (1) and continues from there. If not, judgment and processing of the step (1) and so on are carried out as it is.

When the judgment at step (2) is for operation of the coordinate input key (84), on the other hand, it is determined at step (3) and step (4) whether or not the input end key (85) and the coordinate input key (84) are operated in the same manner as at step (1) and step (2) after input of coordinate values. If neither key is operated, it is determined at step (8) and step (9) whether or not the transversal coordinate value adjust key (86) and longitudinal coordinate value adjust key (87) are operated. If only the longitudinal coordinate value adjust key (87) is operated, indication of the coordinate value display (81) corresponding to the longitudinal coordinate value adjust key (87) being operated is adjusted at step (10), then the sequence returns to step (3) and continues from there. If not, judgment and processing at step (3) and step (4) follow as it is. If the judgment at step (3) is for operation of the input end key (85), the area setting operation is completed. If the judgment at step (4) is for operation of the coordinate input key (84), judgment and processing at step (1) and so on are carried out after input of coordinate values.

In short, input by the transversal coordinate adjust key (86) or longitudinal coordinate adjust key (87) is selectively accepted at every operation of the coordinate input key (84). This can prevent problems, for example that the coordinate values in the longitudinal direction are changed in the middle of setting of coordinate values in the transversal direction.

By the above embodiment, therefore, the coordinate indication key corresponding to the coordinate in each direction to be set can be identified easily, and wrong input of coordinates can be prevented effectively. Prevention of mistaken input of coordinates is ensured further as coordinate input by the wrong coordinate indication key is prohibited while coordinate input by one coordinate indication key is accepted.

Figure 9:
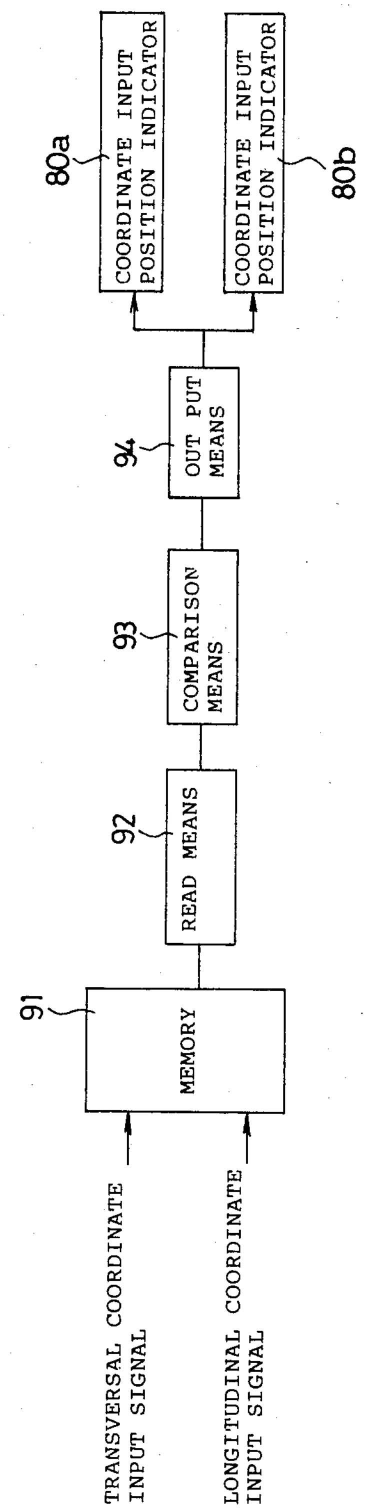
FIG. 9 is a block diagram showing the apparatus for judging effectiveness of the set area.

FIG. 9 is a block diagram showing the apparatus for judging effectiveness of the set area. Coordinate input signals in the transversal direction (the direction perpendicular to the document exposure direction) and coordinate input signals in the longitudinal direction (the document exposure direction) are applied to memory (91). The apparatus is also provided with a read means (92) to read the coordinates of two points in a diagonal direction stored in the memory (91) as a pair, with a comparing means (93) to compare coordinate values in the same direction by using the coordinates of the two points read by the read means (92) as the input, with an output means (94) to give an output signal which indicates that area setting is non-effective by using the output signal which indicates equality of the coordinate values of at least one direction from the comparison means (93) as the input, and also with coordinate input position indicators (80*a*) (80*b*) to show the area setting condition only when area setting is effective and by using the output signal from the output means (94) as the input. (See FIG. 7 as well.) As the operation panel, the one of FIG. 7 is adopted.

Figure 10:
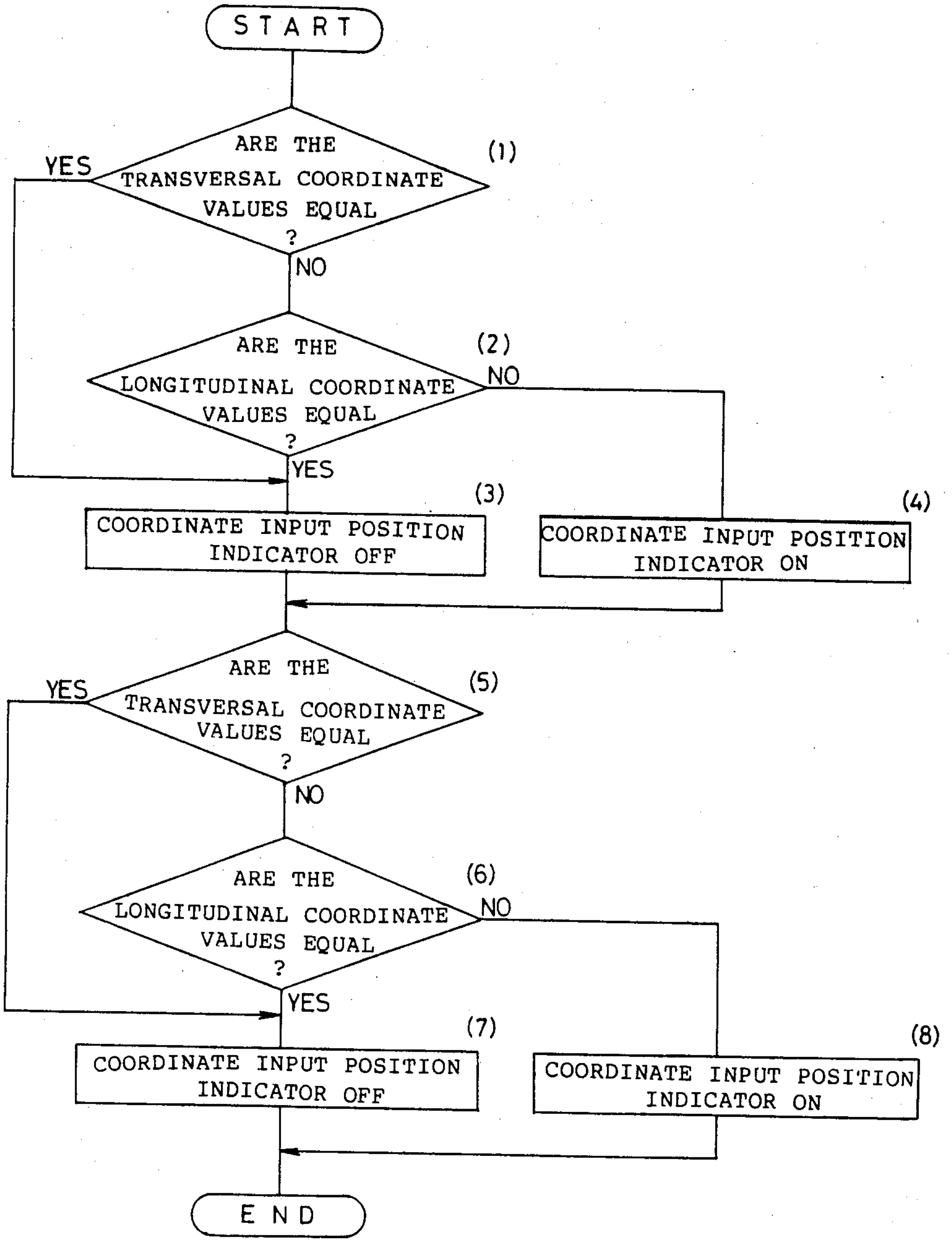
FIG. 10 is a flow chart to explain the effectiveness judging operation.

FIG. 10 is a flow chart to show operation of the section to determine effectiveness of the area setting device. At step (1) and step (2), it is determined whether or not the coordinate values in the transversal direction of the pair of points are equal and whether or not the coordinate values in the longitudinal direction of the pair of points are equal. If either pair are judged equal, the coordinate input position indicators (80*a*) (80*b*) of the applicable area indicator (80) are turned off at step (3) to indicate that the set area is non-effective. If both are judged not equal, on the other hand, the coordinate input position indicators (80*a*) (80*b*)of the applicable area indicator (80) are turned on at step (4) to indicate that the set area is effective.

After processing at step (3) or step (4), it is judged at step (5) and step (6) whether or not the coordinate values in the transversal direction of a pair of points of the other area are equal and the coordinate values in the longitudinal direction of the other area are equal. If either pair are judged equal, the coordinate input position indicators (80*a*) (80*b*) of the applicable area display (80) are turned off at step (7) to indicate that the set area is non-effective. If both are judged not equal, on the other hand, the coordinate input position indicators (80*a*) (80*b*) of the applicable area display (80) are turned on at step (8) to indicate that the set area is effective.

Figure 11:
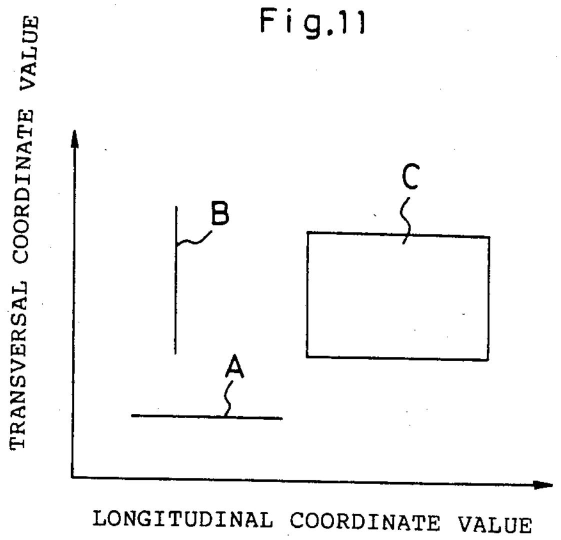
FIG. 11 shows a specific example of set area.

In other words, the set area shown by A in FIG. 11 has no effective area for edit processing because the coordinate values in the transversal direction are equal, while the set area shown by B in the drawing has no effective area for edit processing because the coordinate values in the longitudinal direction are equal. In such a case, the coordinate input position indicators (80*a*) (80*b*) are turned off to indicate that the set area is non-effective.

The set area shown by C in FIG. 11 has an effective area for edit processing because the coordinate values differ from each other in both directions, and the coordinate input position indicators (80*a*) (80*b*) are turned on, in this case, to indicate that the set area is effective. Accordingly, the area setting operation as a whole is as follows. Coordinate values in the transversal direction can be set by operating the coordinate input key (84), the transversal coordinate value adjust key (86), and then the coordinate input key (84) again. Then coordinate values in the longitudinal direction can be set by operating the longitudinal coordinate value adjust key (87) and the coordinate input key (84). It is also possible to set two areas which should be set by performing operations one after another for each one of two points in the diagonal direction of the two areas which should be set. Then coordinate setting of each point is completed by operating the input end key (85). Accordingly, it is possible to select setting of one area merely by controlling the timing to operate the input end key (85).

After completing coordinate setting of each required point in the above manner, the judging operation shown in the above flow chart is made, and only the coordinate input position indicators (80*a*) (80*b*) of the area display (80) corresponding to the effective set area are turned on to indicate that the set area is effective or not effective.

By the above embodiment, therefore, it is easy to set area again by knowing non-effective area setting before image forming if not-effective area is set, which serves to prevent useless image forming operations and wasting of copying paper.

Figure 12:
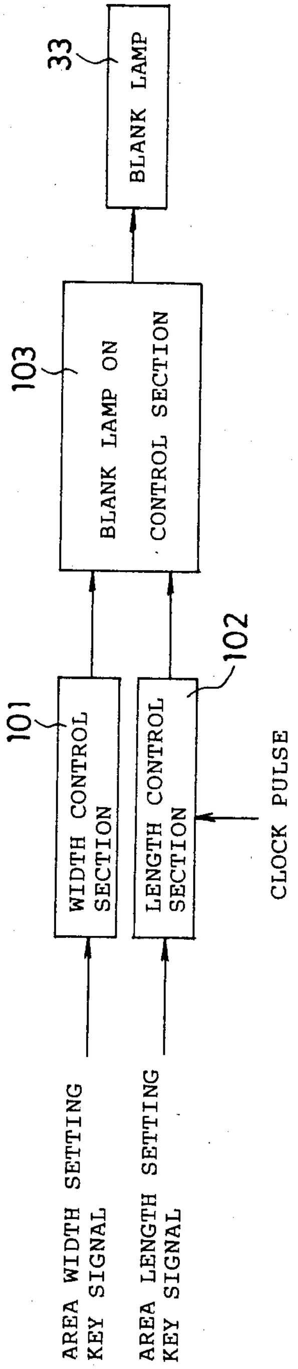
FIG. 12 is a block diagram to show the device for forming images in the range corresponding to the set area.

FIG. 12 is a block diagram of the apparatus to form an image in the range corresponding to the set area, which applies an area width set key signal to the width control section (101), an area length set key signal to the length control section (102), the control signals from the width control section (101) and also from the length control section (102) to the blank lamp light control section (103), and controls the number of lamps turned to one of the coordinate input position indicators comprising the blank lamp (33) (FIG. 6) as well as the on or off times of the lamps.

To the length control section (102), clock pulses are applied, synchronized with the drive power source (not illustrated) to drive each component of the copying machine, photoreceptor drum (31) in particular, and the length control section (102) keeps the data to show transfer distance of the photoreceptor drum (31) per unit time, which is determined by the clock pulses and the data to show the distance between the luminescent elements comprising the blank lamp (33). The operation panel is as shown in FIG. 7 and the document holder is as shown in FIG. 4.

Figure 13:
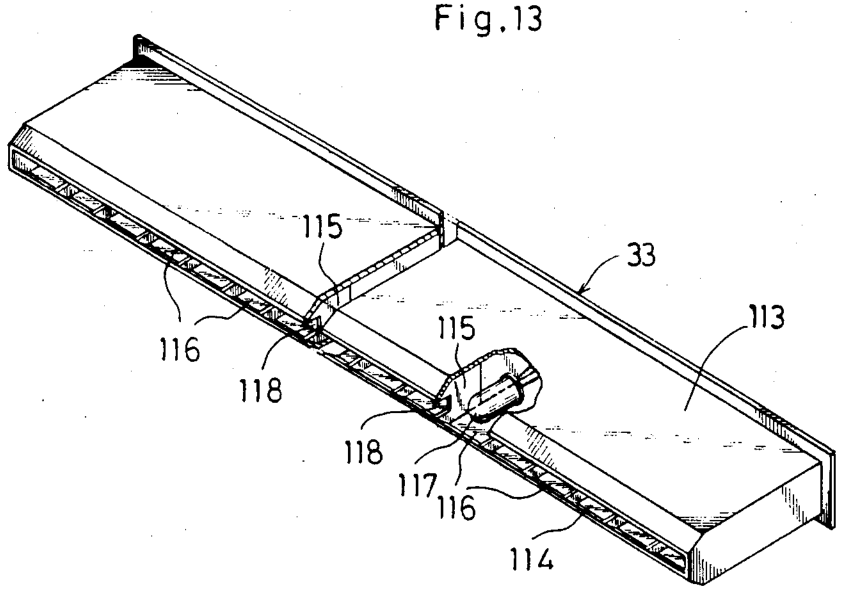
FIG. 13 is a partially cut off view in perspective of a blank lamp.
Figure 14:
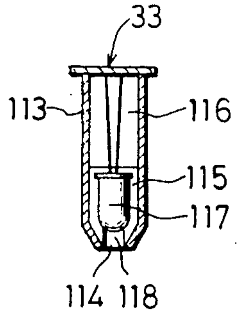
FIG. 14 is a fragmentary vertical sectional view of the blank lamp.

FIG. 13 and FIG. 14 show the blank lamp (33). An opening (114) is provided at one side of an elongated box (113), and two or more partition plates (115) are attached to form two or more chambers (116) in the longitudinal direction, and a luminescent element (117) is provided within each chamber (116). More specifically, the opening (114) is narrower toward the top so as to be cut sharp in the longitudinal direction. In addition, the partition plates (115) are provided with a notch (118) at the top end so as to avoid insufficient light at the boundary. The notch (118) makes the trimmed area slightly smaller and the masked area a little larger in the transversal direction, but it causes no problem because the difference is about one mm. maximum.

Figure 15:
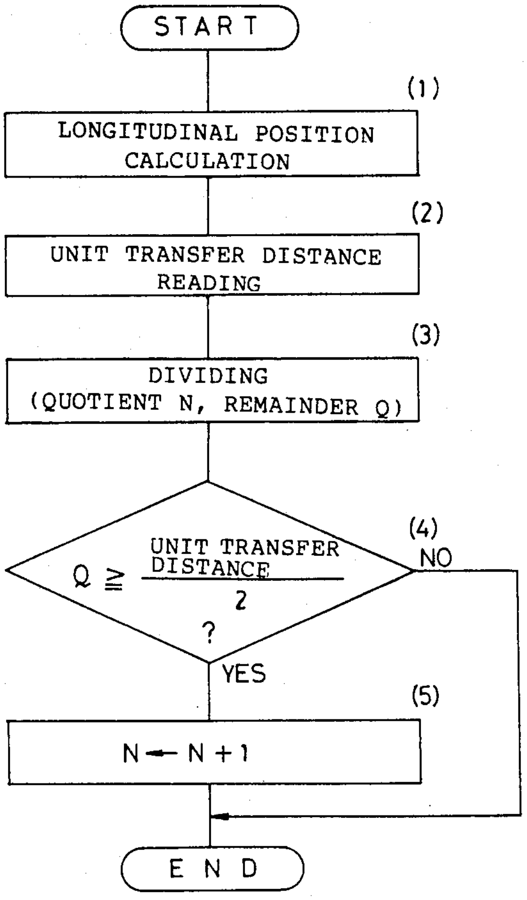
FIG. 15 is a flow chart to show the key points of the image forming operation.

FIG. 15 is a flow chart to explain the image forming operation of the main sections. At step (1), the exact position in the longitudinal direction is given by the coordinate values when the coordinate input key (84) is operated, after operation of the longitudinal coordinate value adjust key (87), multiplied by the distance between the luminescent elements (117) in the blank lamp (33). At step (2), the transfer distance on the surface of the photoreceptor drum (31) per unit time, which is determined by the clock pulses, is read out from the memory (not illustrated), and at step (3), the quotient N and the remainder Q are calculated by dividing the value obtained at step (1) by the value obtained at step (2). Then at step (4), it is determined whether or not the remainder Q is over half the distance obtained at the above step (2). If at step (4) the remainder Q is found to be over a half, the number of clock pulses to keep the luminescent elements (117) on or off is increased by one over the quotient N by increasing the quotient N obtained at step (3) by one at step (5). If at step (4) the remainder Q is judged not over half of the distance, on the other hand, the number of clock pulses for keeping the luminescent elements (117) on or off is kept at the quotient N.

To be more specific, at a setting of six mm. for the distance between luminescent elements (117) and of 1.27 mm. for the transfer distance on the surface of the photoreceptor drum (31) per unit time which is determined by the clock pulse, the transfer distance is 6.35 mm. when the number of clock pulses is 5, which is the closest to the distance between the luminescent elements (117). However, if the number of clock pulses five times larger than the set coordinate value is simply used, the error of 0.35 mm. is increased in proportion to the increase in the distance from the reference position. As a result, the shape of the area in the copied material actually obtained differs greatly from the shape of the area expected by the operator during area setting. By the above embodiment, however, the error is not accumulated, even if the distance from the reference position increases, and is kept at 1.27/2=0.635 mm. or less at all times.

Accordingly, it is possible to keep the shape of the area in the copied material actually obtained close to the shape of area expected by the operator at area setting with a very high accuracy. The difference between both is evident from the following table.

TABLE

| Scale | Set distance (mm) | Number of pulses This embodiment /Conventional | Actual distance This embodiment /Conventional |
|---|---|---|---|
| 1 | 6 | 5/5 | 6.35/6.35 |
| 2 | 12 | 9/10 | 11.43/12.70 |
| 5 | 30 | 24/25 | 30.48/31.75 |
| 10 | 60 | 47/50 | 59.69/63.50 |
| 20 | 120 | 94/100 | 119.28/127.00 |
| 40 | 240 | 189/200 | 240.03/254.00 |
| 60 | 360 | 283/300 | 359.41/381.00 |

By this embodiment, therefore, it is possible to apply trimming and masking to the actually obtained copy in the area similar to the area expected by the operator performing the area setting operation with high accuracy.

We claim:

1. An area setting device for setting the coordinates of two points in a diagonal direction in one or more areas of the copying zone of a photocopier comprising:
(a) memorizing means for selectively memorizing whether coordinate inputs have been applied corresponding to each point which can be set;
(b) first memory control means for memorizing the coordinates of the first point of all areas for which coordinate input conditions have already been memorized;
(c) coordinate input control means for accepting only a key input indicative of the first point among the points memorized as being in a coordinate non-input state;
(d) judging means for determining whether the next point to be memorized is in a coordinate non-input state or a coordinate input state; and
(e) second memory control means responsive to the determination made by the judging means, or to a determination that no more coordinates are to be inputted, for memorizing that a specific point is in a coordinate input state at the time of input of a coordinate for the point memorized as being in a coordinate non-input state and also for memorizing the point of the next order as being in a coordinate non-input state.

2. An area setting device according to claim 1, further comprising a transparent member to be set on a document for which the area is to be set, said transparent member having coordinate displays in two directions crossing each other at right angles and markings at specific positions on the transparent member.

3. An area setting device according to claim 2, further comprising an operation panel including means for setting image forming conditions, coordinate input position indicators corresponding to each direction, and coordinate value indicators corresponding to each direction at the specific positions on the operation panel.

4. An area setting device according to claim 3, in which the coordinate displays in the two directions are respectively marked in two different colors, and the coordinate input position indicators corresponding to each direction are colored in the corresponding colors.

5. An area setting device according to claim 3, in which each coordinate value indicator shows coordinate values in the same color as the corresponding coordinate display.

* * * * *